(12) United States Patent
Roos et al.

(10) Patent No.: US 8,475,333 B2
(45) Date of Patent: Jul. 2, 2013

(54) METHOD AND APPARATUS FOR EFFECTING LIGHT-OFF OF A CATALYTIC CONVERTER IN A HYBRID POWERTRAIN SYSTEM

(75) Inventors: Bryan Nathaniel Roos, West Bloomfield, MI (US); Brian L. Spohn, Holly, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 242 days.

(21) Appl. No.: 13/101,341

(22) Filed: May 5, 2011

(65) Prior Publication Data

US 2012/0283067 A1   Nov. 8, 2012

(51) Int. Cl.
  *F02N 11/08* (2006.01)
  *H02P 17/00* (2006.01)
  *F16H 59/74* (2006.01)

(52) U.S. Cl.
  USPC ................... 477/20; 477/100; 123/179.4

(58) Field of Classification Search
  USPC .............. 477/20, 100, 107; 123/179.1, 179.3, 123/179.4
  See application file for complete search history.

(56) References Cited

U.S. PATENT DOCUMENTS

| | | | |
|---|---|---|---|
| 5,931,757 A | 8/1999 | Schmidt | |
| 6,367,570 B1 | 4/2002 | Long, III et al. | |
| 6,397,963 B1 | 6/2002 | Lennevi | |
| 6,784,563 B2 | 8/2004 | Nada | |
| 7,395,659 B2 | 7/2008 | Pott | |
| 7,933,711 B1* | 4/2011 | Ulrey et al. | 701/112 |
| 2010/0305830 A1* | 12/2010 | Santoso et al. | 701/103 |
| 2011/0047980 A1* | 3/2011 | Santoso et al. | 60/285 |

OTHER PUBLICATIONS

U.S. Appl. No. 13/027,499, filed Feb. 15, 2011, Roos.

* cited by examiner

*Primary Examiner* — Tisha Lewis (57) ABSTRACT

A powertrain system includes a hybrid transmission and an internal combustion engine coupled to an exhaust aftertreatment device. A method for operating the powertrain system includes operating the hybrid transmission to generate tractive torque responsive to an operator torque request with the internal combustion engine in an engine-off state so long as the tractive torque is less than a threshold. The internal combustion engine is operated in an engine-on state at preferred operating conditions to effect light-off of the exhaust aftertreatment device and the hybrid transmission is coincidentally operated to generate tractive torque responsive to the operator torque request when the operator torque request exceeds the threshold. The internal combustion engine is then operated in the engine-on state to generate tractive torque responsive to the operator torque request.

16 Claims, 3 Drawing Sheets

METHOD AND APPARATUS FOR EFFECTING LIGHT-OFF OF A CATALYTIC CONVERTER IN A HYBRID POWERTRAIN SYSTEM

GOVERNMENT CONTRACT RIGHTS

The U.S. Government has a paid-up license in this invention and the right in limited circumstances to require the patent owner to license others on reasonable terms as provided for by the terms of Project Number DE-FC26-08NT04386 awarded by the U.S. Department of Energy.

TECHNICAL FIELD

This disclosure is related to hybrid powertrain systems and controlling thereof to effect light-off of a catalytic converter.

BACKGROUND

The statements in this section merely provide background information related to the present disclosure and may not constitute prior art.

Known hybrid powertrain systems use internal combustion engines and torque machines to generate tractive torque that may be transferred to a driveline via a transmission device. Known torque machines including electric motor/generator devices, hydro-mechanical devices, and other machines that convert stored energy to mechanical torque.

Known hybrid powertrain systems operate in either a charge-sustaining configuration or a charge-depleting configuration with regard to energy storage devices. Known hybrid powertrain systems include controlling the internal combustion engine using autostart and autostop control schemes. Known torque machines have limited output torque capability. Known hybrid powertrain systems preferentially use the torque machines to generate tractive torque when commanded output torque is less than the output torque capability of the torque machines and a state of charge of the energy storage device is greater than a threshold. As such, a hybrid powertrain system may operate under conditions wherein vehicle operation may not include an engine-on condition during an entire key-on cycle, so long as a commanded torque output does not exceed a threshold and a state of charge of the energy storage device is greater than a minimum threshold.

SUMMARY

A powertrain system includes a hybrid transmission and an internal combustion engine coupled to an exhaust aftertreatment device. A method for operating the powertrain system includes operating the hybrid transmission to generate tractive torque responsive to an operator torque request with the internal combustion engine in an engine-off state so long as the tractive torque is less than a threshold. The internal combustion engine is operated in an engine-on state at preferred operating conditions to effect light-off of the exhaust aftertreatment device and the hybrid transmission is coincidentally operated to generate tractive torque responsive to the operator torque request when the operator torque request exceeds the threshold. The internal combustion engine is then operated in the engine-on state to generate tractive torque responsive to the operator torque request.

BRIEF DESCRIPTION OF THE DRAWINGS

One or more embodiments will now be described, by way of example, with reference to the accompanying drawings, in which:

FIGS. 3-1, 3-2, and 3-3 illustrate data associated operation of an embodiment of the vehicle including the hybrid powertrain system during execution of the control scheme described with reference to FIG. 2 in accordance with the disclosure.

DETAILED DESCRIPTION

Figure 1:
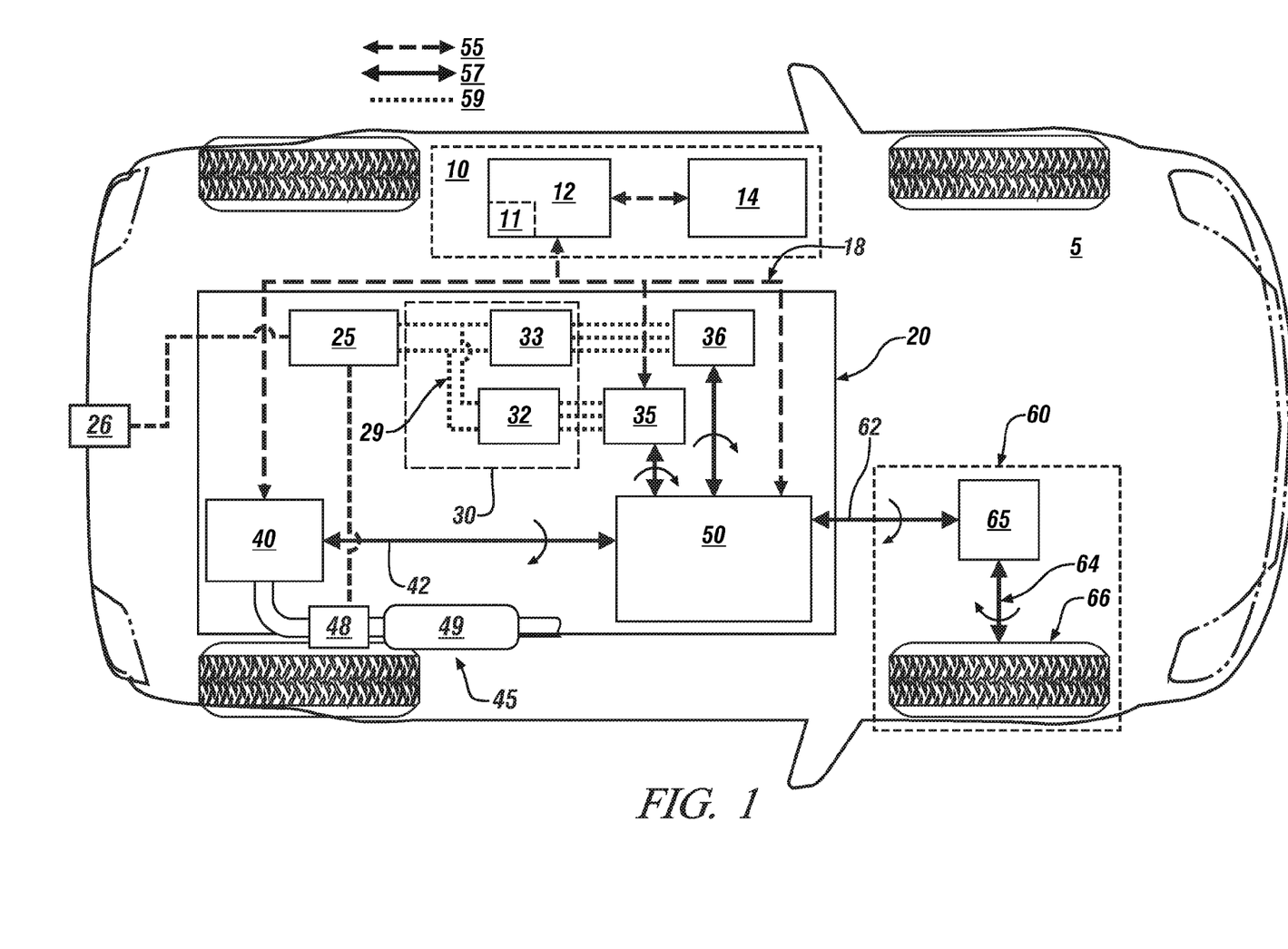
FIG. 1 illustrates an embodiment of a vehicle including a hybrid powertrain system coupled to a driveline and controlled by a control system in accordance with the disclosure.

Referring now to the drawings, wherein the showings are for the purpose of illustrating certain exemplary embodiments only and not for the purpose of limiting the same, FIG. 1 illustrates vehicle 5 including an embodiment of a hybrid powertrain system 20 coupled to a driveline 60 and controlled by a control system 10. Like numerals refer to like elements throughout the description. The hybrid powertrain system 20 employs suitable communications paths 55, suitable mechanical power paths 57, and suitable high-voltage electric power paths 59. The mechanical power paths 57 mechanically couple elements that generate, use, and/or transfer torque, including an internal combustion engine 40, first and second electrically-powered torque machines 35 and 36, respectively, a hybrid transmission 50, and a driveline 60. The high-voltage electric power paths 59 electrically connect elements that generate, use, and/or transfer high-voltage electric power, including an energy storage device 25, an inverter module 30, and the first and second electrically-powered torque machines 35 and 36. The high-voltage electric power paths 59 include a high-voltage bus 29. The communications path 55 includes high-speed data transfer lines to effect communications between various elements of the vehicle 5, and may include one or more of a direct connection, a local area network bus, and a serial peripheral interface bus, and include a high-speed communications bus 18. The embodiment of the vehicle 5 including the hybrid powertrain system 20 is illustrative.

The energy storage device 25 may be any suitable energy storage device, e.g., a high-voltage battery. One exemplary energy storage device 25 is a high-voltage battery fabricated from a plurality of lithium-ion cells. It is appreciated that the energy storage device 25 may include a plurality of electrical cells, ultracapacitors, and other suitable devices configured to store electric energy on-vehicle.

The engine 40 is preferably a multi-cylinder direct fuel injection internal combustion engine that converts fuel to mechanical power through a combustion process. The engine 40 fluidly couples to an exhaust aftertreatment system 45. The engine 40 is equipped with a plurality of sensing devices and actuators configured to monitor operation and deliver fuel to form a combustion charge to generate torque. In one embodiment, the engine 40 is configured to operate as a spark-ignition engine with timing of combustion and the associated engine torque being controlled by advancing or retarding spark ignition timing. In one embodiment the engine 40 is configured as a spark-ignition direct-injection (SIDI) engine that operates in either a spark-ignition combustion mode or a controlled auto-ignition (HCCI) combustion mode. Alternatively, the engine 40 is configured to operate as a compression-ignition engine with timing of combustion and the associated engine torque controlled by advancing or retarding timing of fuel injection events. The engine 40 is configured to execute engine fueling schemes and/or ignition timing schemes to generate a suitable exhaust gas feedstream to facilitate light-off of catalytic element(s) of the exhaust aftertreatment system 45. Suitable engine fueling schemes may include multiple fuel injection events, split-fuel injection with late combustion fuel injection events and post-combustion fuel injection events. Suitable spark timing schemes may include retarding spark timing. The engine 40 is configured to execute autostart and autostop control schemes and fuel cut-off (FCO) control schemes during ongoing operation of the vehicle system 5. By way of definition, the engine 40 is considered to be in an engine-off (OFF) state when it is not being fueled and is not spinning. The engine 40 is considered to be in a fuel-cutoff (FCO) state when it is spinning but is not fueled and firing. The engine 40 is considered to be in an engine-on (ON) state when it is fueled and firing and preferably generating torque.

The exhaust aftertreatment system 45 includes including suitable devices for oxidizing, reducing and otherwise converting constituents of the exhaust gas feedstream to preferred gas forms that are expelled into the atmosphere. In one embodiment, the exhaust aftertreatment system 45 includes an electrically heated catalytic element (EHC) 48 preferably located upstream of a second converter element 49. The EHC 48 preferably includes a substrate having a resistive heating element that is electrically connectable to the energy storage device 25 and operatively connected to the control system 10. The control system 10 controls activation and deactivation of electric power flow to the EHC 48. In one embodiment, the substrate having the resistive heating element is coated with a washcoat and catalytic materials that oxidize, reduce and otherwise convert a portion of the exhaust gas feedstream to harmless gases when the substrate element is heated. In one embodiment, the second converter element 49 includes a three-way catalytic converter element. In one embodiment the second converter element 49 includes a hydrocarbon adsorber. In one embodiment the second converter element 49 includes a NOx adsorber. In one embodiment, the second converter element 49 includes a particulate filter.

The first and second torque machines 35 and 36 preferably include multi-phase electric motor/generators electrically connected to the inverter module 30 that are configured to convert stored electric energy to mechanical power and convert mechanical power to electric energy that may be stored in the energy storage device 25. The first and second torque machines 35 and 36 have limitations in power outputs in the form of torque and rotational speeds.

The inverter module 30 includes first and second inverters 32 and 33 that electrically connect to the first and second torque machines 35 and 36, respectively. The first and second torque machines 35 and 36 interact with the respective first and second inverters 32 and 33 to convert stored electric energy to mechanical power and convert mechanical power to electric energy that may be stored in the energy storage device 25. The first and second electric power inverters 32 and 33 are operative to transform high voltage DC electric power to high-voltage AC electric power and also operative to transform high voltage AC electric power to high-voltage DC electric power. Electric power originating in the first torque machine 35 may be transferred electrically to the energy storage device 25 via the inverter module 30 and the high-voltage bus 29 and to the second torque machine 36 via the inverter module 30. Electric power originating in the second torque machine 36 may be transferred electrically to the energy storage device 25 via the inverter module 30 and the high-voltage bus 29 and to the first torque machine 35 via the inverter module 30 and the high-voltage bus 29.

The hybrid transmission 50 preferably includes one or more differential gear sets and activatable clutch components to transfer torque between the engine 40, the first and second torque machines 35 and 36, and an output member 62. The output member 62 couples to the driveline 60 to transfer tractive torque thereto. The hybrid transmission 50 is preferably a two-mode transmission device configured to generate and transfer torque in a fixed gear mode or in one of two distinct gear trains referred to as Mode 1 and Mode 2. Mode 1 includes employing a single one of the torque machines, e.g., the second torque machine 36 to generate tractive torque. Mode 2 includes employing both the first and second torque machines 35 and 36 to generate tractive torque. Operating the powertrain system 10 to generate tractive torque includes operating the hybrid transmission 50 in one of the fixed gear mode, Mode 1 and Mode 2 and controlling the engine 40 in one of the ON state, the OFF state, and the FCO state.

The driveline 60 may include a differential gear device 65 that mechanically couples to an axle 64 or half-shaft that mechanically couples to a wheel 66 in one embodiment. The differential gear device 65 is coupled to the output member 62 of the hybrid powertrain system 20, and transfers output power therebetween. The driveline 60 transfers tractive power between the hybrid transmission 50 and a road surface.

Mechanical power originating in the engine 40 may be transferred via an input member 42 to the first torque machine 35 and to the output member 62 via the hybrid transmission 50. Mechanical power originating in the first torque machine 35 may be transferred to the engine 40 via the hybrid transmission 50 and the input member 42, and may be transferred to the output member 62 via the hybrid transmission 50. Mechanical power originating in the second torque machine 36 may be transferred via the hybrid transmission 50 to the output member 62. Mechanical power may be transferred between the hybrid transmission 50 and the driveline 60 via the output member 62. Operating parameters associated with mechanical power transfer include power between the engine 40 via the hybrid transmission 50 indicated by input torque Ti and input speed Ni, and power between the hybrid transmission 50 and the driveline 60 indicated by tractive torque To and output speed No. When the energy storage device 25 is a high-voltage battery, it stores potential electric energy and is electrically connected via the high-voltage bus 29 to the inverter module 30 that connects to the first and second torque machines 35 and 36 to transfer electric power therebetween. In one embodiment, an external connector 26 electrically connects to the high-voltage battery 25 and is connectable to an external AC power source to provide electric power for charging the high-voltage battery 25.

Parameters associated with the energy storage device 25 include a state-of-charge, temperature, available voltage, and available battery power, each of which is monitored by the control system 10. The available battery power describes battery power limits that include an allowable range between a minimum and maximum allowable battery power, described as a maximum state of charge and a minimum state of charge, respectively. It is appreciated that the battery power is measured in terms of a parameter that may be regularly monitored, e.g., the state-of-charge (hereafter SOC) or another suitable parameter. The allowable battery power limits are preferably established at threshold levels to prevent either overcharging or overdischarging of the energy storage device 25, which may result in damage that reduces service life thereof.

An electric power management system may be either a charge-depleting system or a charge-sustaining system. The terms charge-depleting system and charge-sustaining system define and indicate an operating strategy for using and managing stored electric power in a hybrid vehicle during a key-on cycle. During a key-on cycle, a charge-depleting system preferentially generates tractive torque exclusively using the torque machines until the SOC of the energy storage device 25 is less than a predetermined threshold, at which time an internal combustion engine is activated to generate torque for either or both tractive torque and electric power generation. During a key-on cycle, a charge-sustaining system generates tractive torque using both the engine and the torque machines, with the intent of maintaining the SOC of the energy storage device 25 within a predetermined range during the entire key-on cycle, and with the intent that the SOC at the end of the key-on cycle is substantially the same as the SOC at the beginning of the key-on cycle. Magnitudes of threshold states described herein are determined and correspond to whether the electric power management system is a charge-depleting system or a charge-sustaining system.

The control system 10 includes a control module 12 that signally connects to an operator interface 14. The control module 12 includes a low-voltage electric power supply to provide regulated electric power thereto. It is appreciated that there is a plurality of human/machine interface devices through which the vehicle operator commands operation of the vehicle 5, including, e.g., an ignition switch to enable an operator to crank and start the engine 40, an accelerator pedal, a brake pedal, and a transmission range selector, i.e., PRNDL. Vehicle operator commands include an operator torque request, which indicates an operator request for a magnitude of tractive torque delivered to the driveline 60 to effect vehicle acceleration. It is appreciated that vehicle acceleration includes positive and negative acceleration events.

Although the control module 12 and operator interface 14 are shown as individual discrete elements, such an illustration is for ease of description. It is appreciated that the functions described as being performed by the control module 12 may be combined into one or more devices, e.g., implemented in software, hardware, and/or application-specific integrated circuitry (ASIC) and ancillary circuits that are separate and distinct from the control module 12. It is appreciated that information transfer to and from the control module 12 may be accomplished using the communications paths 55, including, e.g., communications bus 18.

The control module 12 preferably signally and operatively connects to individual elements of the hybrid powertrain system 20 via the communications bus 18. The control module 12 signally connects to the sensing devices of each of the energy storage device 25, the inverter module 30, the first and second torque machines 35 and 36, the engine 40, and the hybrid transmission 50 to monitor operation and determine parameters thereof.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Monitored parameters of the engine 40 preferably include engine speed, engine torque or load, and temperature, including the input torque Ti and input speed Ni. Monitored parameters of the hybrid transmission 50 preferably include rotational speeds, including the tractive torque To and output speed No, and hydraulic pressure at a plurality of locations, from which parameters including application of specific torque transfer clutches may be determined Monitored parameters of the first and second torque machines 35 and 36 preferably include rotational speeds and power flows, e.g., electric current flow, from which motor torques may be determined Monitored parameters of the energy storage device 25 may include battery power, state of charge, and battery temperature in one embodiment.

The control module 12 operatively connects to the actuators of the inverter module 30 including the first and second inverters 32 and 33, the engine 40, and the hybrid transmission 50 to control operation thereof in accordance with executed control schemes that are stored in the form of algorithms and calibrations. It is appreciated that each of the first and second inverters 32 and 33 transforms electric power in a manner suitable for generating torque with one or both the first and second torque machines 35 and 36, and transforms mechanical power in a manner suitable for generating electric power with one or both the first and second torque machines 35 and 36, depending upon torque inputs and operating conditions.

The control module 12 executes control schemes to control operation of the engine 40 in coordination with the first and second torque machines 35 and 36 to manage transfer of mechanical power to the driveline 60 in response to the operator torque request concurrent with controlling operation of the inverter module 30 to manage electric power flow. Such control schemes include balancing operation of the engine 40 with allowable power limits associated with the energy storage device 25. This includes controlling operation of the engine 40 to achieve a preferred engine speed/load operating point that achieves a peak or otherwise preferred efficiency.

Figure 2:
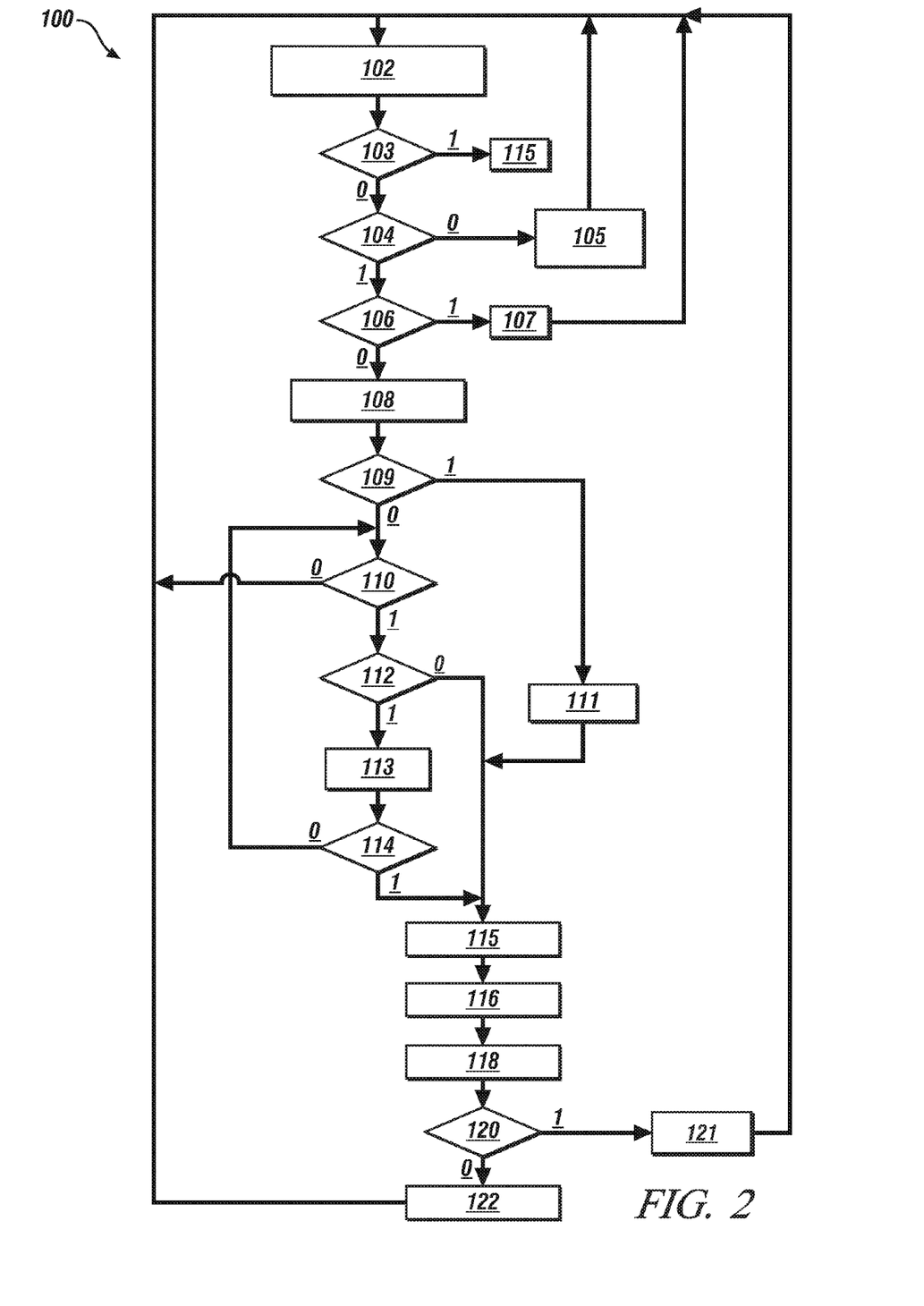
FIG. 2 illustrates a control scheme for controlling operation of a hybrid powertrain in response to an operator torque request to effect light-off of the exhaust aftertreatment device in accordance with the disclosure.

FIG. 2 illustrates a control scheme 100 for controlling operation of a hybrid powertrain, e.g., the hybrid powertrain 20 described with reference to FIG. 1 using a suitable high-voltage battery as the energy storage device 25. The control scheme 100 controls operation of the hybrid powertrain 20 in response to an operator torque request. This includes operating the hybrid powertrain system 20 to effect light-off of the exhaust aftertreatment device 45 when conditions demand operation of the engine 40 to generate torque for tractive torque and/or for electric power generation. This is now described in detail with reference to FIG. 2 and Table 1.

A commanded torque output includes a combined torque output from the torque-generative devices, e.g., the internal combustion engine 40 and the first and second torque machines 35 and 36, that is responsive to the operator torque request and other powertrain system power demands, including, e.g., power demands for electric power and hydraulic pressure flow. Tractive torque is the combination of output torques generated by the torque-generative devices, e.g., the internal combustion engine 40 and the first and second torque machines 35 and 36 that is transferred to the driveline. The tractive torque is responsive to the operator torque request.

Table 1 is provided as a key wherein the numerically labeled blocks and the corresponding functions of the control scheme 100 shown with reference to FIG. 2 are set forth as follows.

TABLE 1

| BLOCK | BLOCK CONTENTS |
|---|---|
| 102 | Monitor Treq, SOC, To, No, N, and Vss |
| 103 | Is To > To__Max__Mode__1__Eng__Off? |
| 104 | Is No > No__Max__Mode__1__Eng__Off? |
| 105 | Generate tractive torque in Mode__1__Eng__Off in response to Treq |
| 106 | Is To < To__Max__Mode__2__Eng__Off? |
| 107 | Go to Mode__2__Eng__Off |
| 108 | Generate tractive torque in Mode__2__FCO in response to Treq and Spin Engine |
| 109 | Is Engine Fueling Request due to Battery power limits? or Does Treq exceed output torque capacities of the first and second torque machines? |
| 110 | Is To > To__Max__Mode__2__FCO at present engine speed? |
| 111 | Reduce To__Max__Mode__2__FCO (next event) |
| 112 | Can Ni Increase to Hold__Fuel__Cut ? |
| 113 | Activate EHC Heating |
| 114 | Is Target Ni to Hold__Fuel__Cut >> Target Ni for Catalyst Light-off? |
| 115 | Initiate engine fueling and firing; operate the engine in the ON state |
| 116 | Operate the engine in the ON state and control engine to predetermined speed/load operating point and preferred combustion timing for elapsed time period to effect catalyst light-off |
| 118 | Control torque machines responsive to Treq less engine output torque for elapsed time period |
| 120 | Compare Treq and To__Max__Mode__2__LO |
| 121 | Abort Light-off event |
| 122 | Control engine responsive to Treq |

During each key-on cycle, elements of the powertrain system 20 generate torque outputs that include a tractive torque that is transferred to the driveline 60 in response to an operator torque request. The powertrain system 20 initially operates the hybrid transmission 50 in Mode 1 to generate tractive torque with the internal combustion engine 40 in the OFF state.

During ongoing operation, vehicle and powertrain operating parameters including the operator torque request (Treq), tractive torque (To), output speed (No) which relates to vehicle speed (Vss), engine speed (N), and SOC (state of charge) of the energy storage device 25 are monitored (102). The powertrain system 20 operates the hybrid transmission 50 in a first mode, e.g., Mode 1, which includes generating tractive torque with a single one of the torque machines, e.g., the second torque machine 36. Initially, as being described herein, the engine 40 is in the OFF state.

The tractive torque is regularly and periodically compared to a first tractive torque threshold associated with operating the hybrid transmission 50 in Mode 1 with the engine 40 in the OFF state (Is To>To_Max_Mode_1_Eng_Off) (103). The first tractive torque threshold (To_Max_Mode_1_Eng_Off) is a maximum tractive torque achievable by the powertrain system 20 when operating the hybrid transmission 50 in Mode 1 with the engine 40 in the OFF state with a torque reserve maintained for spinning and starting the engine 40.

When the tractive torque is less than the first tractive torque threshold (0), the output speed is compared to a first output speed threshold (Is No>No_Max_Mode_1_Eng_Off) (104). The first output speed threshold (No_Max_Mode_1_Eng_Off) is a maximum output speed achievable by the powertrain system 20 when operating the hybrid transmission 50 in Mode 1 with the engine 40 in the OFF state with a torque reserve maintained for spinning and starting the engine 40. When the output speed less than the first output speed threshold (0), tractive torque is generated while operating the hybrid transmission 50 in Mode 1 with the engine 40 in the OFF state (105).

When the output speed greater than the first output speed threshold (1), the tractive torque is compared to a second tractive torque threshold associated with operating the hybrid transmission 50 in Mode 2 (Is To>To_Max_Mode_2_Eng_Off) (106). The second tractive torque threshold (To_Max_Mode_2_Eng_Off) is a maximum tractive torque achievable by the powertrain system 20 when operating the hybrid transmission 50 in Mode 2 with the engine 40 in the OFF state with a torque reserve maintained for spinning and starting the engine 40.

When the tractive torque is less than the second tractive torque threshold associated with operating the hybrid transmission 50 in Mode 2 (0), operation is commanded in Mode 2 with the engine 40 in the OFF state (107). Operating the hybrid transmission 50 in Mode 2 with the engine 40 in the OFF state includes generating tractive torque using both the first and second torque machines 35 and 36 with the engine 40 in the OFF state. The powertrain system 10 operates with the hybrid transmission 50 in Mode 2 in response to the operator torque request so long as the SOC of the energy storage device 25 is greater than a threshold and the first and second torque machines 35 and 36 are capable of achieving the operator torque request.

When the tractive torque is greater than the second tractive torque threshold associated with operating the hybrid transmission 50 in Mode 2 (1), operation is commanded in Mode 2 in the FCO state (Mode_2_FCO) to generate tractive torque and transfer torque to the input member 42 to spin the engine 40 (108). An electrically heated catalytic element, e.g., EHC 48, may be activated at this time on an embodiment that includes the EHC 48. The engine 40 subsequently spins, but initially spins in the FCO state. In one embodiment, the first torque machine 35 is employed to spin the engine 40 and the second torque machine 36 is employed to generate the tractive torque.

During operation with the engine 40 in the FCO state, it is determined whether the request to spin and start the engine 40 is associated with battery power, i.e., if the SOC is less than a preferred magnitude requiring operation of the engine 40 to generate power for tractive torque and for battery charging, or if the operator torque request is greater than the output torque capacities of the first and second torque machines 35 and 36 while operating in Mode 2 (109). If so (109)(1), a maximum tractive torque (To_Max_Mode_2_FCO) is reduced (111) and the operation continues by initiating engine fueling, firing the engine, and operating the engine 40 in the ON state to achieve catalyst light-off (115). The maximum tractive torque (To_Max_Mode_2_FCO) is a maximum tractive torque achievable by the powertrain system 20 when operating the hybrid transmission 50 in Mode 2 with the engine 40 in the FCO mode. If not (109)(0), the request to spin the engine 40 is associated with the operator torque request, and the tractive torque is compared to the maximum tractive torque for the present engine speed (To>To_Max_Mode_2_FCO_N) which is determined at the present engine speed (N) (110).

When the tractive torque is greater than the maximum tractive torque for the present engine speed (1), it is determined whether the engine speed is able to increase to a target input speed (Hold Fuel Cut) (112).

When the engine speed is unable to increase to the target input speed (0), the operation continues by initiating engine fueling, firing the engine, and operating the engine 40 in the ON state to achieve catalyst light-off (115).

When the engine input speed is able to increase to the target input speed (1), the operation continues by activating electric power flow to the EHC 48 on systems so equipped (113) and the target input speed is compared to a target engine speed for catalyst light-off (114). When the target input speed is substantially greater than the target engine speed for catalyst light-off (1) an electric power boost converter is enabled to increase speed of the first torque machine 35 to the target input speed on systems so equipped. Preferably, the system executes at least one loop with the electric power boost converter enabled. After executing at least one loop with the electric power boost converter enabled, the system begins initiating engine fueling, firing the engine, and operating the engine 40 in the ON state to achieve catalyst light-off (115).

Operating the engine in the ON state and controlling operation to predetermined speed/load operating point to effect catalyst light-off includes operating the engine 40 at a preferred speed/load operating point and a preferred combustion timing for an elapsed time period (116). During this period, the engine 40 preferably generates a predetermined magnitude of engine torque regardless of the operator torque request. Coincidentally, the hybrid transmission 50 is operating in Mode 2 with the first and second torque machines 35 and 36 controlled to generate tractive torque that is responsive to the operator torque request and takes into account the output torque of the engine 40 (118). Thus, the first and second torque machines 35 and 36 are controlled as primary load followers responsive to the operator torque request. The operation of the engine 40 is preferably not adjusted in response to transient loads and speeds during this elapsed time period.

During the elapsed time period of operating the engine in the ON state to effect light-off of the exhaust aftertreatment device 45 (116), the predetermined operating conditions for operating the engine 40 include predetermined states for engine speed, engine airflow (load), spark timing, and fuel injection mass and timing to achieve a preferred speed/load operating point and preferred combustion timing, including generating a predetermined magnitude of engine torque. Operating the engine 40 preferably includes controlling combustion timing by controlling spark timing and/or fuel injection timing to generate an exhaust gas feedstream that includes preferred constituents suitable for effecting catalyst light-off. Controlling the combustion timing may include retarding spark timing, retarding fuel injection timing, executing a split fuel injection strategy including post-combustion fuel injection, and/or other suitable control schemes to generate an exhaust gas feedstream that includes preferred constituents suitable for effecting catalyst light-off.

The elapsed time period to effect light-off the exhaust aftertreatment device 45 is a suitable period of time that may be experimentally determined, is associated with specific design and operating characteristics of the engine 40 and the exhaust aftertreatment device 45, and is preferably in a range of 5 to 10 seconds.

The operator torque request (Treq) is compared to the output torque capacities of the first and second torque machines 35 and 36 with the hybrid transmission 50 operating in Mode 2 in conjunction with operation of the engine 40 at the preferred speed/load operating point to effect catalyst light-off (To_Max_Mode_2_LO) during an elapsed period of time (120).

When the operator torque request is substantially greater than the output torque capacities of the first and second torque machines 35 and 36 in conjunction with operation of the engine 40 at the preferred speed/load operating point (1), the catalyst light-off operation is aborted (121), and the engine 40 is operated in response to the operator torque request. In addition, the operation of the engine 40 at the preferred speed/load operating point for the elapsed period of time to effect catalyst light-off may be aborted when an output power request associated with the battery, the first and second torque machines 35 and 36, or another output power cannot be met using the present operating scheme. When the operation of the engine 40 at the preferred speed/load operating point for the elapsed period of time to effect catalyst light-off is frequently aborted, the threshold torque (To_Max_Mode_2_FCO) that is employed to initiate spinning the engine, engine fueling, and associated operation to achieve catalyst light-off may be reduced.

Operation of the engine 40 subsequent to the elapsed period of time to effect catalyst light-off includes controlling the engine 40 at a speed/load operating point that is responsive to the operator torque request (122). Thus, the engine 40 may be the primary load follower responsive to the operator torque request during this period. Coincidentally, the hybrid transmission 50 operates in a suitable one of the fixed gear mode, Mode 1 and Mode 2 to transfer torque to the driveline 60. However, the torque output from the hybrid transmission 50 is preferably not controlled in response to the operator torque request. Engine operation may include power generation that is further responsive to a state of charge of the high-voltage battery 25.

It is appreciated that subsequent engine operation may include operating the engine 40 to generate substantially all the tractive torque, operating the engine in the FCO state, executing an autostop control scheme and operating the engine in the OFF state while using one or both the first and second torque machines 35 and 36 to generate the tractive torque, or operating in either Mode 1 or Mode 2 with the engine and one or both the first and second torque machines 35 and 36 generating tractive torque responsive to the operator torque request.

Figure 31:
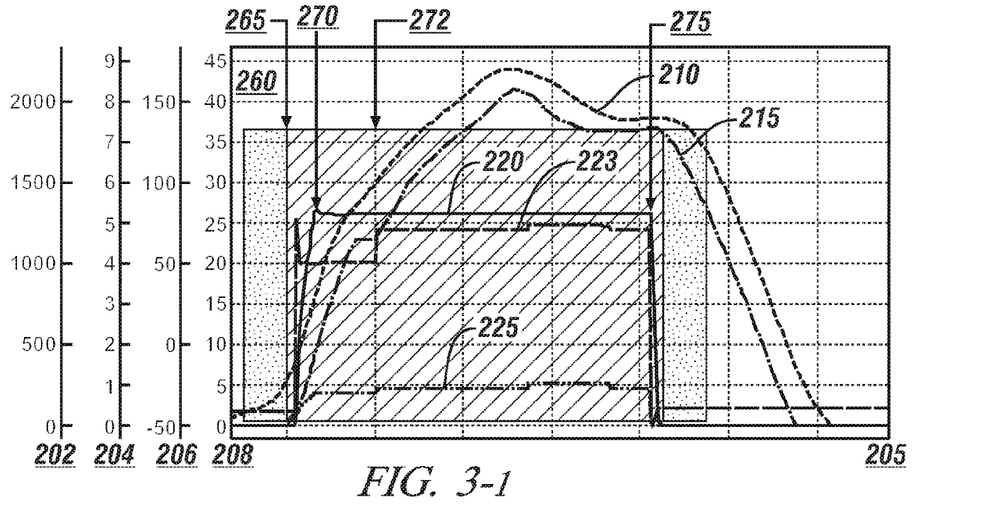
Figure 32:
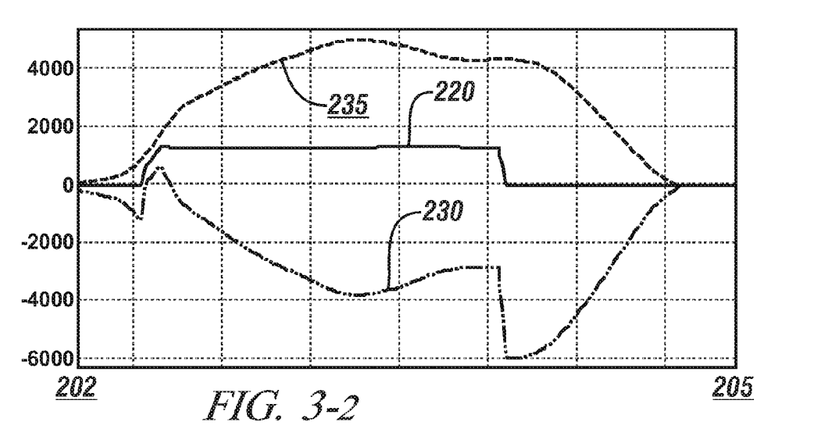
Figure 33:
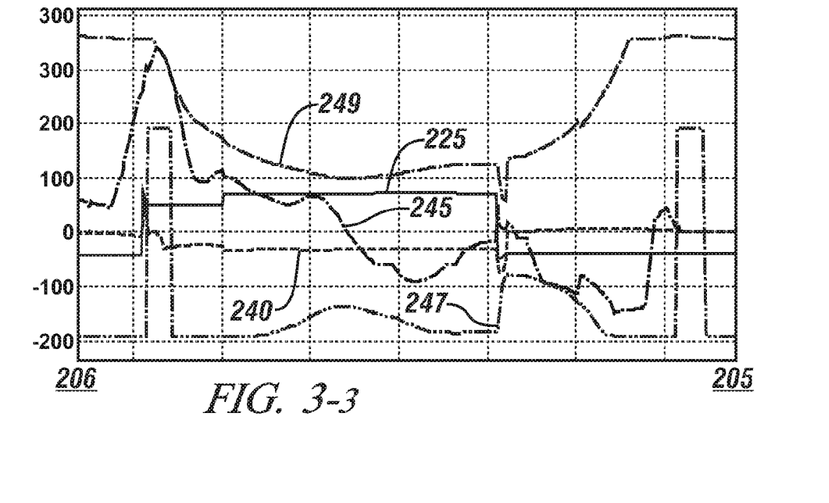

FIGS. 3-1, 3-2, and 3-3 graphically illustrate data associated operation of an embodiment of the vehicle 5 including the hybrid powertrain system 20 that is configured to execute the control scheme 100. The depicted data is as described herein with reference to the individual figures with a common scale of elapsed time (105) shown on the y-axis.

FIG. 3-1 includes y-axis scales of rotational speed (RPM) 202, fuel flowrate (gm/sec) 204, torque (N-m) 206, and vehicle speed (km/h) 208, and shows data associated with simulated vehicle operation including an operator torque request in the form of vehicle speed (210) and a commanded minimum target vehicle speed (215), depicting a time-rate change thereof. Engine operation in the form of engine speed (220), engine brake torque (223), and engine fuel flowrate (225) are shown.

FIG. 3-2 includes the y-axis scale of rotational speed (RPM) 202 and shows rotational speeds of the first torque machine 35 (230) and the second torque machine 36 (235), and the engine speed (220), all corresponding to the vehicle operation shown with reference to FIG. 3-1.

FIG. 3-3 includes the y-axis scale of torque (N-m) 206 and shows torque outputs of the first torque machine 35 (240), the second torque machine 36 (245) and the engine brake torque (N-m) (223) corresponding to the vehicle operation shown with reference to FIG. 3-1. Also depicted are a motoring limit torque for the first torque machine 35 (247) and a motoring limit torque for the second torque machine 36 (249).

FIGS. 3-1, 3-2, and 3-3 show that during an initial operating period (260), the operator torque request as indicated by the commanded minimum target vehicle speed (215) may be achieved using torque outputs from the first and second torque machines 35 and 36, with no torque contribution from the engine 40. The engine 40 is neither operating nor spinning as shown.

At time point 265, the operator torque request indicated by the commanded minimum target vehicle speed (215) exceeds a torque capacity of the second torque machine 36 that allows for torque to spin the engine 40. The control system acts to spin the engine 40, and the engine speed (220) increases. As shown, the engine fueling (225) begins substantially immediately thereafter with the engine operating in the ON state.

At time point 270, the engine operates in the ON state increasing to achieve a preferred engine speed, which is near 1300 rpm (220).

At time point 272, the engine speed (220) approaches the preferred engine speed (220), e.g., near 1300 rpm, and a preferred load point as indicated by the engine fueling (225) to generate a preferred engine brake torque (223), as shown. Initially, the tractive torque is primarily generated using the second torque machine 36, with some limited contribution by the engine 40. The engine 40 primarily operates to generate an exhaust gas feedstream that effects light-off of the exhaust aftertreatment system 45. The engine brake torque (223) may be used to contribute to the tractive torque or may be used with the first torque machine 35 to generate electric power for tractive torque generation by the second torque machine 36. The engine operation is controlled to the preferred engine speed and the preferred load point as indicated by the engine fueling (225) to generate the preferred engine brake torque (223) for an elapsed time period that has been predetermined for the specific engine 40 and exhaust aftertreatment system 45.

At time point 275, the elapsed time period to effect light-off of the exhaust aftertreatment system 45 expires, and the engine 40 is controlled to an engine speed/load operating point to generate tractive torque in response to the operator torque request, in conjunction with the second torque machine 36. Torque output from the second torque machine 36 is reduced accordingly.

The operator torque request may subsequently decrease (as shown), including reducing to a point whereat an autostop control scheme is executed to stop the engine 40 and resume operation in one of Mode 1 or Mode 2 with the engine in the OFF state. The tractive torque is generated using the first and second torque machines 35 and 36, which may include operating a regenerative braking control scheme to recover electric power from vehicle momentum during braking.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating a powertrain system including a hybrid transmission and an internal combustion engine coupled to an exhaust aftertreatment device, comprising:
    operating the hybrid transmission to generate tractive torque responsive to an operator torque request with the internal combustion engine in an engine-off state so long as the tractive torque is less than a threshold;
    operating the internal combustion engine in an engine-on state at preferred operating conditions to effect light-off of the exhaust aftertreatment device and coincidentally operating the hybrid transmission to generate tractive torque responsive to the operator torque request when the operator torque request exceeds the threshold; and then
    operating the internal combustion engine in the engine-on state to generate tractive torque responsive to the operator torque request.

2. The method of claim 1, wherein the internal combustion engine is operated in the engine-on state at preferred operating conditions to effect light-off of the exhaust aftertreatment device for a predetermined duration sufficient to effect light-off of the exhaust aftertreatment device.

3. The method of claim 1, wherein said preferred operating conditions comprise a preferred engine operating point.

4. The method of claim 1, wherein said preferred operating conditions comprise a preferred engine operating point and a preferred combustion timing.

5. The method of claim 4, wherein the internal combustion engine is operated in the engine-on state at preferred operating conditions to effect light-off of the exhaust aftertreatment device for a predetermined duration sufficient to effect light-off of the exhaust aftertreatment device.

6. The method of claim 1, wherein operating the hybrid transmission to generate tractive torque comprises operating the hybrid transmission in a first mode, the method further comprising:
    when the tractive torque exceeds the threshold prior to operating the internal combustion engine in the engine-on state at preferred operating conditions to effect light-off of the exhaust aftertreatment device, operating the hybrid transmission in a second mode to generate tractive torque responsive to the operator torque request with the internal combustion engine in a fuel cutoff state.

7. The method of claim 1, further comprising coincidentally operating the hybrid transmission in one of a first and a second mode when operating the internal combustion engine in the engine-on state to generate tractive torque responsive to the operator torque request.

8. The method of claim 1, wherein the threshold corresponds to a predetermined limit on hybrid transmission generated tractive torque with the internal combustion engine in the engine-off state.

9. Method for operating a hybrid powertrain system including an internal combustion engine and a plurality of torque machines configured to transfer torque to a transmission, the transmission coupled to a driveline, the method comprising:
    operating the internal combustion engine in an engine-on state at preferred operating conditions to effect light-off of an exhaust aftertreatment device and coincidentally operating the torque machines to generate tractive torque responsive to an operator torque request when the operator torque request exceeds a predetermined limit on torque machine generated tractive torque with the internal combustion engine in an engine-off state; and
    subsequent to effecting light-off of the exhaust aftertreatment device, operating the internal combustion engine in the engine-on state to generate tractive torque responsive to the operator torque request.

10. The method of claim 9, further comprising operating the torque machines to generate tractive torque responsive to the operator torque request with the internal combustion engine in the engine-off state so long as the tractive torque is less than said predetermined limit.

11. The method of claim 9, wherein the internal combustion engine is operated in the engine-on state at preferred operating conditions to effect light-off of the exhaust aftertreatment device for a predetermined duration sufficient to effect light-off of the exhaust aftertreatment device.

12. The method of claim 9, wherein said preferred operating conditions comprise a preferred engine operating point.

13. The method of claim 9, wherein said preferred operating conditions comprise a preferred engine operating point and a preferred combustion timing.

14. The method of claim 13, wherein the internal combustion engine is operated in the engine-on state at preferred operating conditions to effect light-off of the exhaust aftertreatment device for a predetermined duration sufficient to effect light-off of the exhaust aftertreatment device.

15. The method of claim 9, wherein operating the hybrid transmission to generate tractive torque comprises operating the hybrid transmission in a first mode, the method further comprising:
   when the tractive torque exceeds the threshold prior to operating the internal combustion engine in the engine-on state at preferred operating conditions to effect light-off of the exhaust aftertreatment device, operating the hybrid transmission in a second mode to generate tractive torque responsive to the operator torque request with the internal combustion engine in a fuel cutoff state.

16. The method of claim 9, further comprising coincidentally operating the hybrid transmission in one of a first and a second mode when operating the internal combustion engine in the engine-on state to generate tractive torque responsive to the operator torque request.

* * * * *